United States Patent [19]

Stritt et al.

[11] 4,351,620

[45] Sep. 28, 1982

[54] DEVICE FOR FASTENING BUILT-IN WIRING DEVICES

[75] Inventors: Helmut Stritt, Schwetzingen; Alfred Schmidt, Beerfelden-Gammelsbach; Erwin Leible, Eberbach, all of Fed. Rep. of Germany

[73] Assignee: Brown, Boveri & Cie Aktiengesellschaft, Mannheim-Käfertal, Fed. Rep. of Germany

[21] Appl. No.: 87,890

[22] Filed: Oct. 24, 1979

[30] Foreign Application Priority Data

Oct. 25, 1978 [DE] Fed. Rep. of Germany ....... 2846443

[51] Int. Cl.³ .............................................. F16B 1/00
[52] U.S. Cl. ...................... 403/13; 403/381; 403/24; 361/353; 200/294
[58] Field of Search .............. 403/381, 331, 24, 25, 403/387, 13, 14; 361/353, 355, 346; 200/294

[56] References Cited

U.S. PATENT DOCUMENTS 3,398,249 8/1968 Dessert ................................ 200/294
4,167,769 9/1979 Luke et al. ........................... 361/355
4,251,851 2/1981 Diersing et al. ..................... 361/353

FOREIGN PATENT DOCUMENTS 7601370 8/1976 Fed. Rep. of Germany .
2616525 7/1977 Fed. Rep. of Germany .
842524 7/1960 United Kingdom ................ 200/294
2007434 5/1979 United Kingdom ................ 361/355

Primary Examiner—Andrew V. Kundrat
Attorney, Agent, or Firm—Herbert L. Lerner; Laurence A. Greenberg

[57] ABSTRACT

Device for fastening built-in wiring equipment, the bottom of the wiring equipment having a fixed projection for engaging behind one L-shaped extension of an inverted hat-profile-shaped support channel, and a movable projection for snapping behind another L-shaped extension thereof, including a support plate having a device integral therewith for mounting a bus bar to hold a circuit breaker and a first L-shaped extension engageable with a projection of the wiring equipment, and a support strip attachable to the support plate and having a second L-shaped extension integral therewith, the first and second extensions forming together an inverted hat-profile-shaped support channel.

14 Claims, 9 Drawing Figures

DEVICE FOR FASTENING BUILT-IN WIRING DEVICES

The invention relates to a device for fastening built-in wiring equipment, especially for jointly fastening circuit breakers and bus bars, where the bottom of the wiring devices have a quick-fastening device with a fixed projection, and a movable projection for snap-connecting onto a hat-profile-shaped support channel. The fixed and the movable projection, respectively, in the snapped-on condition engage behind the free legs of the hat-profile-shaped support channel. The fastening device comprises a support plate at which bus bars are mounted and which is provided with a first L-shaped formation, where circuit breakers can be fastened on the support plate in such a manner that the free leg of the first formation engages behind the fixed projection and where, on the other side, the circuit breaker is held at the bus bar.

Such a device serves, especially, for fastening circuit breakers and bus bars connecting the circuit breakers, and is constructed as a so-called integrated bus bar system for circuit breakers, which is provided for installation in wiring distributors, junction boxes and switching installations, etc.

A device of the type mentioned at the outset which has become known, has a support plate of the quick-fastening or snap-on device, which engages behind the stationary projection disposed at the circuit breaker and thus serves for fastening the circuit braker on one side. On the other side, the circuit breaker is fastened to the bus bar which is mounted on bus bar supports at the bottom of the support plate. Equipment with a different quick-fastening device or greater overhang or of a type that are not connected to bus bars, cannot be disposed on the same device next to the circuit breakers.

It is accordingly an object of the invention to provide a device for fastening built-in wiring device, which overcomes the hereinaforementioned disadvantages of the heretofore known devices of this general type, and in which, if required, other equipment such as ground-leakage circuit breakers can also be attached in the same row next to the circuit breakers; the quick-fastening devices of the circuit breakers are matched to the dimensions of the standardized hat-profile-shaped channel.

With the foregoing and other objects in view, there is provided, in accordance with the invention, a device for fastening built-in wiring equipment, especially for jointly fastening circuit breakers and bus bars, the bottom of the wiring equipment having a quick-fastening device with a fixed projection for engaging behind one L-shaped extension of an inverted hat-profile-shaped support channel, and a movable projection for snapping behind another L-shaped extension thereof, comprising a support plate having, toward one side thereof, means integral therewith for mounting a bus bar to hold a circuit breaker and a first L-shaped extension engageable with a projection of the wiring equipment, and a support strip attachable to the support plate and having a second L-shaped extention integral therewith, the first and second extensions forming together an inverted hat-profile-shaped support channel, in such a manner that further wiring equipment can be snapped on.

In accordance with another feature of the invention, the support plate and support strip are extruded sections of metal or plastic, which can also be hollow profiles.

The support strip can be slid, pressed, driven into or fastened in other ways to the support plate at any desired point and with the respectively required length, so that the L-shaped leg at the support plate is supplemented to form a fastening device corresponding to a hat-profile channel. Different constructions for accomplishing the fastening will be discussed hereinafter.

In accordance with a further feature of the invention, the support plate has a recess formed therein, the support strip being insertable in the recess.

In accordance with an added feature of the invention, the recess includes an arcuate extension integral with, and facing in an opposite direction from, the first L-shaped extension, the arcuate extension and the support plate together forming a circular segment-shaped opening, the support strip having a thickened portion insertable in the opening to form the support channel.

In accordance with an additional feature of the invention, the support plate has an upper surface, and there is provided an extension strip integral with the arcuate extension and having a lower surface parallel to and spaced at a given distance from the upper surface of the support plate, forming a guide for the support strip.

In accordance with yet another feature of the invention, the recess is formed in the first L-shaped extension and faces in an opposite direction therefrom, and there is provided a ridge integral with the support plate and spaced at a distance from the first L-shaped extension corresponding to the width of the support strip in direction opposite to the insertion direction, the support strip being insertable between the recess in the first L-shaped extension and the ridge.

In accordance with yet a further feature of the invention, the support plate has an upper surface and the ridge has a surface facing toward the first L-shaped extension, the surfaces forming together an acute angle, and including a V-shaped extension integral with the support strip and having an angle included therein which substantially corresponds to the acute angle, the support strip being snappable between the recess in the first L-shaped extension and the ridge.

In accordance with yet an added feature of the invention, there is provided a marking notch formed in the center of the support strip parallel to the second L-shaped extension.

In accordance with yet an additional feature of the invention, there is provided another marking notch formed in the support plate parallel to the first L-shaped extension and in alignment with the first-mentioned notch, in inserted condition of the device.

In accordance with still another feature of the invention, there is provided a rim integral with each of two sides of the support plate and parallel to the first L-shaped extension for guiding circuit breakers and bus bar supports.

In accordance with still a further feature of the invention, the first L-shaped recess faces toward one of the rims and away from the other of the rims, and the mounting means comprises a ridge integral with the support plate and inclined toward the other rim, forming a trapezoidal opening therebetween.

In accordance with still an added feature of the invention, there is provided a break notch formed in the one rim for breaking-off the rim.

In accordance with still an additional feature of the invention, there is provided a device for fastening built-in wiring equipment, especially for jointly fastening circuit breakers and bus bars, the bottom of the wiring equipment having a quick-fastening device with a fixed projection for engaging behind one L-shaped extension of an inverted hat-profile-shaped support channel, and a movable projection for snapping behind another L-shaped extension thereof, comprising a support plate having means integral therewith for mounting a bus bar to hold a circuit breaker, and an inverted hat-profile-shaped support channel integral therewith and having two L-shaped extensions facing in opposite directions, the L-shaped extension facing the mounting means being shorter than the other of the L-shaped extensions.

In accordance with a concomitant feature of the invention, the mounting means comprises a C-shaped channel forming a trapezoidal opening.

Other features which are considered as characteristic for the invention are set forth in the appended claims.

Although the invention is illustrated and described herein as embodied in device for fastening built-in wiring devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1A:
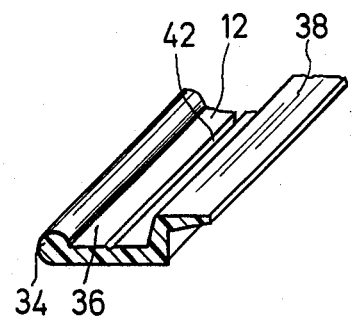
FIGS. 1a, 1b and 1c are respective diagrammatic fragmentary perspective views of a support strip, a support plate into which the strip is slidable, and an assembled view thereof, in accordance with the invention.
Figure 1B:
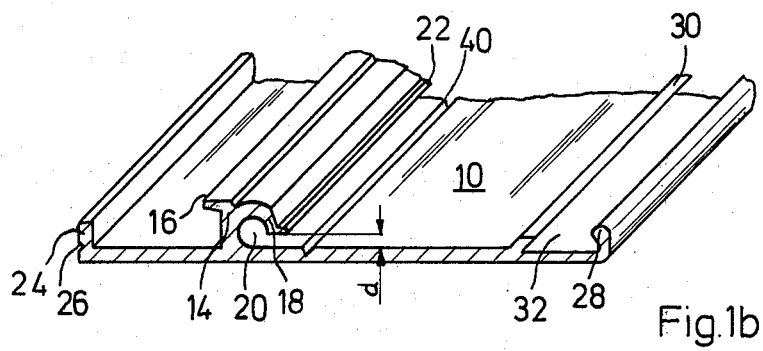
Figure 1C:
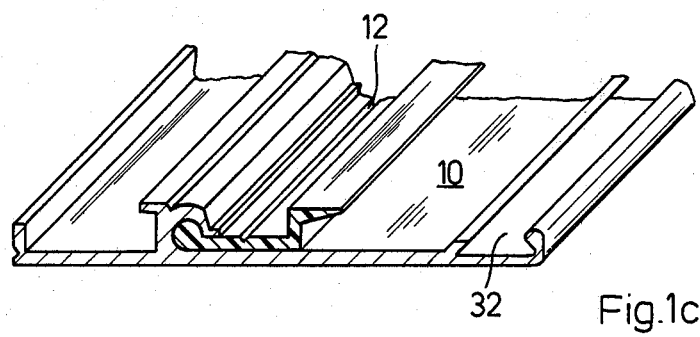

Referring now to the figures of the drawing and first, particularly, to FIGS. 1a, 1b and 1c thereof, there is seen a device which includes a support plate 10 and a support strip 12. These elements are shown assembled in FIG. 1c. A first L-shaped extension or formation 14 is attached to the support plate 10. At the side of the L-shaped formation 14 opposite the free leg 16 thereof, an extension 18 is formed, which leaves a circular opening 20. The extension 18 ends at a distance d from the bottom of the support plate 10 so that the opening 20 is open on that side which is opposite the free leg 16. The surface of the end of the extension 18 is parallel to the bottom of the support plate 10. In order to enlarge this end face somewhat, an extension strip 22 is formed thereon. At the left-hand edge of the support plate 10 which is located on the side to which the free end of the leg 16 points, as shown in FIG. 1, a rim 24 is formed which extends perpendicularly to the bottom surface of the support plate 10. The rim 24 is provided in the vicinity of the upper bottom surface of the support plate 10 with a predetermined break notch 26. On the opposite side of the support plate 10, a further rim 28 is formed which is slightly inclined toward the L-shaped formation. The further rim 28, together with a strip 30 which is inclined toward the further rim 28, forms a trapezoidal recess 32.

At a lengthwise edge, the support strip 12 has a circular bead 34, the cross section of which corresponds to the opening 20; the thickness of the middle region 36 of the support strip 12 corresponds to the distance d. Therefore, the support strip 12 can be pushed so that its bead 34 slides into the opening 20, as can be seen in FIG. 1c. At the other longitudinal edge, opposite the bead 34, the support strip 12 has a second L-shaped extension or formation 38. The second L-shaped formation 38 supplements the first L-shaped formation 14 to form a support device in the manner of a hat-profile-shaped channel.

In FIG. 1b, a notch 40 can be seen to be formed in the support channel 10. In FIG. 1a, it is seen that a further notch 42 is formed in the support strip 12 in the assembled condition, the notches, which run parallel to the first formation 14 and to the support strip 12, are superimposed on top of each other.

In FIG. 1c, the assembly of the support plate 10 and the support strip 12 can be seen; the hat-profile channel-like support device serves for snapping-on a circuit breaker of standard construction; the free leg 16 engages behind the non-illustrated movable projection thereof, which is disposed at the bottom of the circuit breaker, and the other free leg of the L-shaped formation of the support strip 12 engages behind the fixed projection of the standard switching equipment or the circuit breaker. If the switching equipment to be fastened extends beyond the rim 24, the rim must be removed: this is accomplished simply by making a saw cut in the rim 24, and the region which interferes, is broken off along the predetermined break notch 26. The trapezoidal opening 32 serves for fastening bus bar supports which hold bus bars that are not specifically shown. If the support strip 12 is not installed i.e. if the support plate is used as shown in FIG. 1b, then the switching equipment is hooked with its movable projection behind the leg 16 and fastened by screwing on the opposite terminal to the bus bar. As can be seen, the arrangement can be made so that a snap-on connection on the support plate 10 with the support strip 12, as well as on the support plate and the bus bar is possible (see also FIGS. 4 and 5).

Figure 2A:
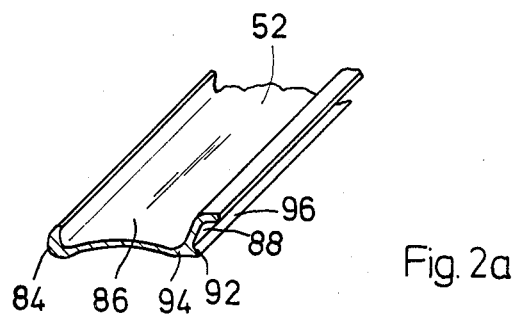
FIGS. 2a, 2b and 2c are views similar to FIGS. 1a, 1b and 1c, of a device according to the invention in which the support strip is snapped onto the support plate.

FIG. 2 shows another embodiment of the invention. The support plate in this embodiment is given the reference numeral 50 and the support strip is given the reference numeral 52. At the support plate 50, a rim 54 is formed at one edge, corresponding to the rim 24 of FIG. 1, with a predetermined break notch 56. At the opposite edge, a further rim 58 and a ridge 60 are seen which, together, form a trapezoidal-shaped opening 62 (in a manner similar to the further rim 28 and the ridge 30 of FIG. 1).

On the support plate 50, a first extension or formation 64 is formed which is L-shaped and has a free leg 66. On the side opposite the free leg, a semicircular recess 70 is formed which is tangential to the bottom of the connection 64 or to the top surface of the support plate 50.

At the top surface, a further ridge 80 is formed which is inclined toward the first formation 64 and the surface of which, pointing toward the formation 64, forms an acute angle $\alpha$ with the lower surface of the support plate 50.

Figure 2B:
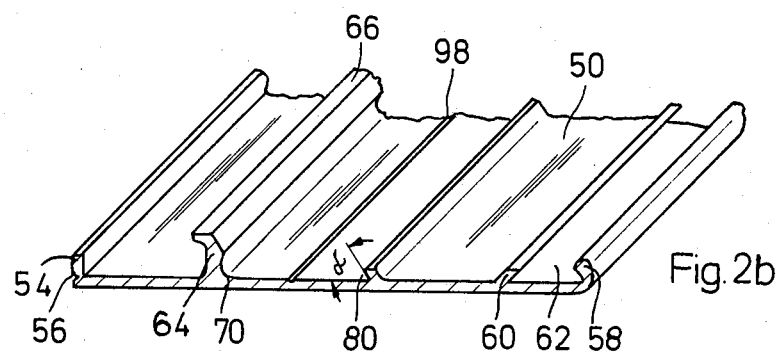
Figure 2C:
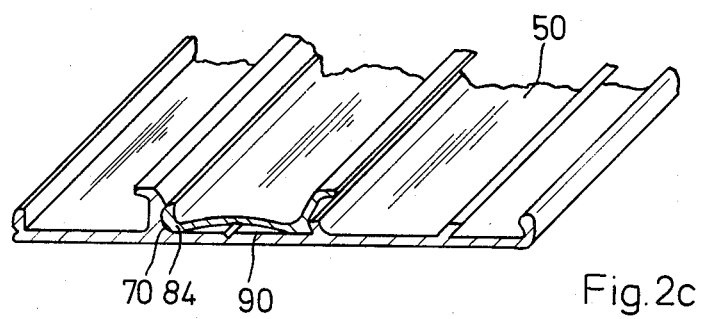

The support strip 52 has at one longitudinal edge thereof, a thicker portion 84 corresponding to the semicircular opening 70 and at the opposite edge a second approximately L-shaped extension or formation 88; the mid-region between the thicker portion 84 and the formation 88, which is designated with reference numeral 86, is arched, so that a circular-segment-shaped space 90 is formed between the support plate 50 and the support strip 52 in the assembled condition, as can be seen from FIG. 2c. At the edge of the support strip 52 opposite the thickened portion 84, a V-shaped extension 92 is formed. On the side of the extension 92 opposite the formation 88, i.e. toward the bottom, there is a straight surface 94 and a slanted surface 96 outside the formation 88. The angle between the straight surface and the slanted surface corresponds to the angle α.

In the assembled condition, which can be seen in FIG. 2c, the thickened portion 84 lies in the semicircular recess 70 and the extension 92 is braced against the further ridge 80. The fastening is then accomplished in such a way that the extension 92 is first inserted into the angular opening between the ridge 80 and the bottom of the support plate 50 and thereupon, the thickened portion 84 is snapped into the recess 70. The support strip 52 is thereby clamped between the recess 70 and the further ridge 80, so that a firm mounting is obtained. As can be seen from FIG. 2c, the formation 64 of the support plate 50, together with the formation 88 of the support strip 52 forms a hat-profile-like fastening device. The arched construction of the bottom or the mid-region 86 of the support strip 52 serves to increase the elasticity, like a built-in spring. In this way, the support strip 52 is self-holding after it has been inserted. This embodiment is, in particular, of advantage if a previously equipped device must be retrofitted.

Figure 3:
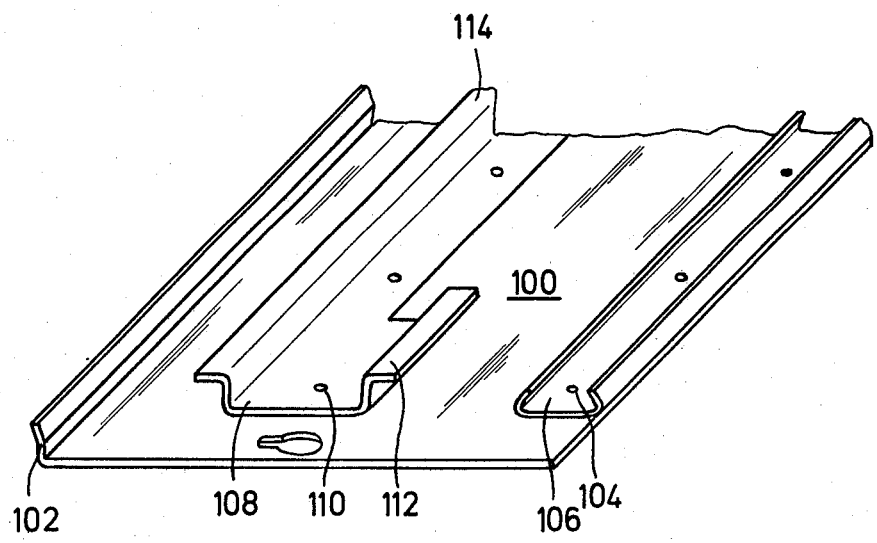
FIG. 3 is a diagrammatic fragmentary perspective view of a device according to the invention in which a hat-profile-shaped channel is riveted onto the support plate.

In FIG. 3, a further embodiment of the invention is shown; the support plate 100 is made of sheet metal and has at its one longitudinal edge an angled-off rim 102 and at the opposite longitudinal edge a channel 104. The ends of the channel 104 are bent in a C-shape toward each other and thereby form a trapezoidal opening 106. In the central region of the support plate, a hat-profile-shaped channel 108 is fastened by spot-welding (at 110). Part of one leg or L-shaped extension 112 thereof is removed or shorter than the other leg 114, as can be seen in the drawing. It is also evident that the region in front serves for snapping-on electrical wiring equipment. Meanwhile in the region to the rear, where the leg 112 is removed, the other leg 114 is hooked behind the movable projection. Furthermore, the circuit breaker or the switching equipment is fastened with its opposite terminal to a bus bar, which is not specifically shown, and is fastened on bus bar supports which are inserted into the recess 106 at the channel 104 and are held there. It this case, the rim 102 serves as a guide for the circuit breaker.

It should be added that FIG. 2b shows a support plate 50 that has a notch 98 formed in the region between the formation 64 and the ridge 80 which serves as the center mark.

Figure 4:
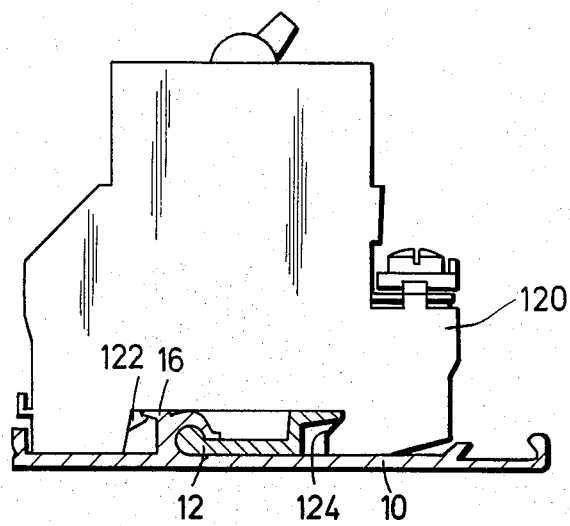
FIGS. 4 and 5 show two ways of fastening wiring equipment, according to the invention.
Figure 5:
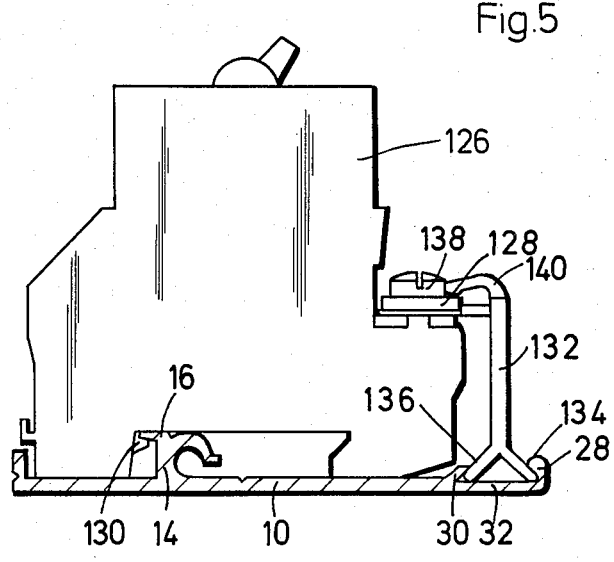

While in FIGS. 1 to 4, essentially the support plate with the strip or the hat-profile channel was shown, it is illustrated in FIGS. 4 and 5 how the combination of the support plate and the support strip of FIGS. 1 and 2 function according to the invention.

In FIG. 4 it is shown how wiring equipment 120 can be snapped onto the support plate 10 and the support strip 12 by means of a fixed projection 124 and a movable projection 122 disposed at the bottom of the equipment.

The free leg 16 of the first formation 14 engages behind the movable projection 122, while the fixed projection 124 engages behind the L-shaped formation 38 of the support strip 12.

In FIG. 5 it is shown how a circuit breaker 126 can be fastened to a bus bar 128 and to the first L-shaped formation 14. There is seen a movable projection 130 which corresponds to the projection 122 of the wiring device 120 and which engages behind the free leg 16 of the L-shaped formation 14. Into the recess 32, a bus bar support 132 is snapped. The bus bar support 132 has, at its lower end, V-shaped arms 134 and 136 which are snapped into the trapezoidal recess 32. At the upper end of the bus bar support 132, the bus bar 128 is fastened. The bus bar 128 is engaged under the terminal screw 138 toward the right-hand side of the drawing, and is screwed-on tight thereat. The circuit breaker 126 is thus mounted by way of the projection 130 engaged behind the leg 16 and the bus bar 128 engaged by the terminal screw 138. The bus bar supports 132 have at the upper ends thereof an extension 140 which is bent toward the terminal screw 138 and serves for supporting the bus bar supports 132. It can be readily seen that the corresponding elements of FIGS. 2 and 3 are utilized to fasten circuit breakers and wiring equipment in a similar manner to that shown in FIGS. 4 and 5 for the device of FIG. 1.

To mount the wiring equipment or circuit breaker shown in FIG. 4, the movable projection 122 is first placed at the proper distance from the fixed projection 124 to accomodate the particular support plate 10, 50, 100. The end of the wiring equipment having the movable projection is first placed on the support plate in such a way that the first projection or leg 14, 64, 114 is disposed above the projection 122 and the equipment 120 is pushed down on the support plate so that the L-shaped formation or leg 38, 88, 112 snaps in on the fixed projection 124 as seen in FIG. 4. If the wiring equipment is very wide, the rim 24, 54, 102 is removed. The equipment can also be mounted by using the projection 14 in place above the movable projection 130 as shown in FIG. 5, without snapping in another leg or formation at the fixed projection of the equipment. In this case a bus bar support 132 is slid into the channel 32, 62, 106 and fastened to the equipment.

We claim:

1. Device for fastening built-in wiring equipment, the bottom of the wiring equipment having a fixed projection for engaging behind one L-shaped extension of a support channel having two L-shaped extensions facing away from each other, and a movable projection for snapping behind another L-shaped extension thereof, comprising a support plate having means integral therewith for mounting a bus bar to hold wiring equipment and a first L-shaped extension engageable with a projection of the wiring equipment, and a support strip attachable to said support plate and having a second L-shaped extension integral therewith, said first and second extensions forming together a support channel having two L-shaped extensions facing away from each other.

2. Device according to claim 1, wherein said support plate and support strip are extruded sections.

3. Device according to claim 1, wherein said support plate has a recess formed therein, said support strip being insertable in said recess.

4. Device according to claim 3, wherein said recess includes an arcuate extension integral with, and facing in an opposite direction, from said first L-shaped extension, said arcuate extension and said support plate together forming a circular segment-shaped opening, said support strip having a thickened portion insertable in said opening to form said support channel.

5. Device according to claim 4, wherein said support plate has an upper surface, and including an extension strip integral with said arcuate extension and having a lower surface parallel to and spaced at a given distance from said upper surface of said support plate, forming a guide for said support strip.

6. Device according to claim 3, wherein said recess is formed in said first L-shaped extension and faces in an opposite direction therefrom, and including a ridge integral with said support plate and spaced at a distance from said first L-shaped extension corresponding to the width of said support strip in direction opposite to said insertion direction, said support strip being insertable between said recess in said first L-shaped extension and said ridge.

7. Device according to claim 6, wherein said support plate has an upper surface and said ridge has a surface facing toward said first L-shaped extension, said surfaces forming together an acute angle, and including a V-shaped extension integral with said support strip and having an angle included therein which substantially corresponds to said acute angle, said support strip being snappable between said recess in said first L-shaped extension and said ridge.

8. Device according to claim 1, including a marking notch formed in the center of said support strip parallel to said second L-shaped extension.

9. Device according to claim 8, including another marking notch formed in said support plate parallel to said first L-shaped extension and in alignment with said first-mentioned slot, in inserted condition of said device.

10. Device according to claim 1, including a rim integral with each of two sides of said support plate and parallel to said first L-shaped extension for guiding circuit breakers and bus bar supports.

11. Device according to claim 10, wherein said first L-shaped recess faces toward one of said rims and away from the other of said rims, and said mounting means comprises a ridge integral with said support plate and inclined toward said other rim, forming a trapezoidal opening therebetween.

12. Device according to claim 11, including a break notch formed in said one rim for breaking-off said rim.

13. Device according to claim 11, wherein said mounting means comprises a C-shaped channel forming a trapezoidal opening.

14. Device for fastening built-in wiring equipment, the bottom of the wiring equipment having a fixed projection for engaging behind one L-shaped extension of a support channel having two L-shaped extensions facing away from each other, and a movable projection for snapping behind another L-shaped extension thereof, comprising a support plate having means integral therewith for mounting a bus bar to hold wiring equipment, and a support channel integral therewith and having two L-shaped extensions facing away from each other, said L-shaped extensions facing said mounting means being shorter than the other of said L-shaped extensions.

* * * * *